（12）United States Patent
Sugino et al.

(10) Patent No.: US 9,923,348 B2
(45) Date of Patent: Mar. 20, 2018

(54) ELECTRIC WIRE PROTECTING PIPE AND WIRE HARNESS

(71) Applicant: Sumitomo Wiring Systems, Ltd., Yokkaichi, Mie (JP)

(72) Inventors: Hidetoshi Sugino, Mie (JP); Hidehiko Iwakawa, Mie (JP)

(73) Assignee: Sumitomo Wiring Systems, Ltd., Yokkaichi, Mie (JP)

( * ) Notice: Subject to any disclaimer, the term of this patent is extended or adjusted under 35 U.S.C. 154(b) by 0 days.

(21) Appl. No.: 15/525,243

(22) PCT Filed: Nov. 28, 2014

(86) PCT No.: PCT/JP2014/081534
§ 371 (c)(1),
(2) Date: May 8, 2017

(87) PCT Pub. No.: WO2016/075840
PCT Pub. Date: May 19, 2016

(65) Prior Publication Data
US 2017/0324227 A1  Nov. 9, 2017

(30) Foreign Application Priority Data

Nov. 12, 2014 (JP) ................................. 2014-229545

(51) Int. Cl.
*H02G 3/04* (2006.01)
*F16L 9/12* (2006.01)
(Continued)

(52) U.S. Cl.
CPC ............... *H02G 3/04* (2013.01); *B60R 16/02* (2013.01); *F16L 9/006* (2013.01); *F16L 9/12* (2013.01);
(Continued)

(58) Field of Classification Search
CPC ...... H02G 3/04; H02G 3/0406; H02G 3/0462; H02G 3/0468; H02G 3/06; B60R 16/02;
(Continued)

(56) References Cited

U.S. PATENT DOCUMENTS 6,811,404 B2 * 11/2004 Doshita ................. H02G 11/00
174/72 A
7,829,789 B2 * 11/2010 Yamaguchi .......... H02G 3/0468
174/68.1
(Continued)

FOREIGN PATENT DOCUMENTS

JP    2003009354 A    1/2003
JP    2009143326 A    7/2009
(Continued)

OTHER PUBLICATIONS

International Search Report and Written Opinion for Application No. PCT/JP2014/081534 dated Jan. 20, 2015, 6 pages.
(Continued)

*Primary Examiner* — Angel R Estrada
(74) *Attorney, Agent, or Firm* — Reising Ethington, P.C.

(57) ABSTRACT

A wire harness and an electric wire protecting pipe that can prevent holes from being formed by flying gravel while the vehicle is moving and includes a bending pipe portion that can be bent easily. The electric wire protecting pipe is a resin pipe into which electric wires are insertable, and includes a bending pipe portion that is easily bent and is provided with protruding portions and recessed portions that are alternately continuous with each other in an axial direction, and a straight pipe portion that is flat and is not easily bent in the axial direction. A thickness of a lower wall portion that is disposed on a lower side when the electric wire protecting pipe is attached to a vehicle is greater than a thickness of a left wall portion and a right wall portion.

3 Claims, 9 Drawing Sheets

(51) Int. Cl.
  *F16L 11/15* (2006.01)
  *F16L 9/00* (2006.01)
  *F16L 55/07* (2006.01)
  *F16L 27/11* (2006.01)
  *B60R 16/02* (2006.01)

(52) U.S. Cl.
  CPC .............. *F16L 11/15* (2013.01); *F16L 27/11* (2013.01); *F16L 55/07* (2013.01)

(58) Field of Classification Search
  CPC . B60R 16/0215; B60R 16/00; B60R 16/0207; F16L 27/11; F16L 9/12; F16L 9/006; F16L 11/15; F16L 9/22; F16L 5/00; F16L 7/00; F16L 9/00
  USPC .............. 174/72 A, 68.1, 68.3, 72 C, 36, 92, 174/72 TR, 88 R, 70 C; 138/121, 118, 138/156, 128, 159, 162, 166, 167, 168, 138/109; 248/73, 74.2, 74.1, 205.2, 248/205.3, 205.6, 49, 68.1
  See application file for complete search history.

(56) References Cited

U.S. PATENT DOCUMENTS

| | | | |
|---|---|---|---|
| 8,563,866 B2* | 10/2013 | Oga | ..................... H02G 3/0462 |
| | | | 174/135 |
| 9,387,818 B2* | 7/2016 | Sugimoto | ............ H02G 3/0468 |
| 2015/0136481 A1 | 5/2015 | Inao | |
| 2016/0009234 A1 | 1/2016 | Adachi | |

FOREIGN PATENT DOCUMENTS

| | | |
|---|---|---|
| JP | 2014042408 A | 3/2014 |
| JP | 2014192906 A | 10/2014 |

OTHER PUBLICATIONS

English Translation of International Search Report for Application No. PCT/JP2014/081534 dated Jan. 20, 2015, 1 page.
International Preliminary Report on Patentability for Application No. PCT/JP2014/081534 dated May 12, 2015, 6 pages.

* cited by examiner

ELECTRIC WIRE PROTECTING PIPE AND WIRE HARNESS

CROSS REFERENCE TO RELATED APPLICATIONS

This application claims the priority of Japanese patent application JP2014-229545 filed on Nov. 12, 2014, the entire contents of which are incorporated herein.

TECHNICAL FIELD

The present invention relates to an electric wire protecting pipe and a wire harness.

BACKGROUND ART

Conventionally, a technique is known with which in order to protect a wire harness that is routed underneath the floor of a vehicle, an electric wire that is a part of the wire harness is inserted into an electric wire protecting pipe and is attached to the vehicle. The electric wire protecting pipe is bent three-dimensionally along a path for routing the wire harness.

As described in Patent Document 1 (JP2009-143326A), for example, an electric wire protecting pipe including a bending pipe portion that is easily bent and a straight pipe portion that is not easily bent is known as this type of electric wire protecting pipe. The bending pipe portion is provided with protruding portions and recessed portions that are alternately continuous with each other in the axial direction, and the straight pipe portion has a shape that is flat in the axial direction.

According to this electric wire protecting pipe, the electric wire protecting pipe can be relatively easily bent three-dimensionally by bending the bending pipe portion, and even if the electric wire protecting pipe is arranged approximately horizontally, the straight pipe portion does not sag by the weight of the wire harness, and thus it is possible to prevent use of numerous clamps for fixing for preventing the electric wire protecting pipe from sagging and to prevent an increase in the number of clamp attachment steps.

SUMMARY

Incidentally, in order to prevent holes from being formed by flying gravel or the like while the vehicle is moving, the electric wire protecting pipe that is attached beneath the floor of a vehicle needs to have a predetermined strength. However, an increase in the strength of the electric wire protecting pipe has been problematic in that then the bending pipe portion is not easily bent, and there is a need to address this situation.

The present design was made based on the above-described circumstances, and an object thereof is to provide a wire harness and an electric wire protecting pipe that can prevent holes from being formed by flying gravel or the like while the vehicle is moving, and that includes a bending pipe portion that can be bent easily.

An electric wire protecting pipe of the present design is a resin pipe into which electric wires are insertable, and includes a bending pipe portion that is easily bent and is provided with protruding portions and recessed portions that are alternately continuous with each other in an axial direction, and a straight pipe portion that is flat and is not easily bent in the axial direction. In either the bending pipe portion or the straight pipe portion, a thickness of a lower wall portion that is disposed on a lower side when the electric wire protecting pipe is attached to a vehicle is greater than a thickness of a left wall portion and a right wall portion that are disposed on left and right sides, and the lower wall portion is a relatively thick-walled portion, whereas the left wall portion and the right wall portion are relatively thin-walled portions.

A wire harness of the present design is obtained by inserting a plurality of electric wires into the electric wire protecting pipe.

According to the present design, because the lower wall portion that tends to be hit by flying gravel or the like while the vehicle is moving has a high strength, and the left wall portion and the right wall portion that are disposed on the left and right side deform easily, it is possible to prevent holes from being formed in the electric wire protecting pipe by flying gravel or the like while the vehicle is moving, and the bending pipe portion can be easily bent in the horizontal direction.

DESCRIPTION OF EMBODIMENTS

A preferred embodiment will be described below.

In an electric wire protecting pipe of the present design, a cross section that is approximately orthogonal to the axial direction may have a flat shape in which a length in a direction in which the left wall portion and the right wall portion face each other is longer than a length in a direction in which the upper wall portion that is disposed on the upper side when the electric wire protecting pipe is attached to a vehicle and the lower wall portion face each other.

Such a configuration makes it possible to reduce its height, compared to cases where the cross section has a circular shape, for example, and thereby is advantageous in cases where there is a limitation on the height of an arrangement space. Also, compared to a bending pipe portion having a circular cross section, such a flat bending pipe portion is easily bent in an vertical direction, and thus even if the lower wall portion is thick, the bending pipe portion can be easily bent in the vertical direction. Furthermore, compared to the bending pipe portion having a circular cross section, the flat bending pipe portion is not easily bent in the horizontal direction, but the bending pipe portion can be easily bent in the horizontal direction because the left wall portion and the right wall portion are thin. That is, the bending pipe portion can be easily bent in the vertical direction and the horizontal direction.

Embodiments

Hereinafter, an embodiment will be described in detail with reference to FIGS. 1 to 10.

Figure 1:
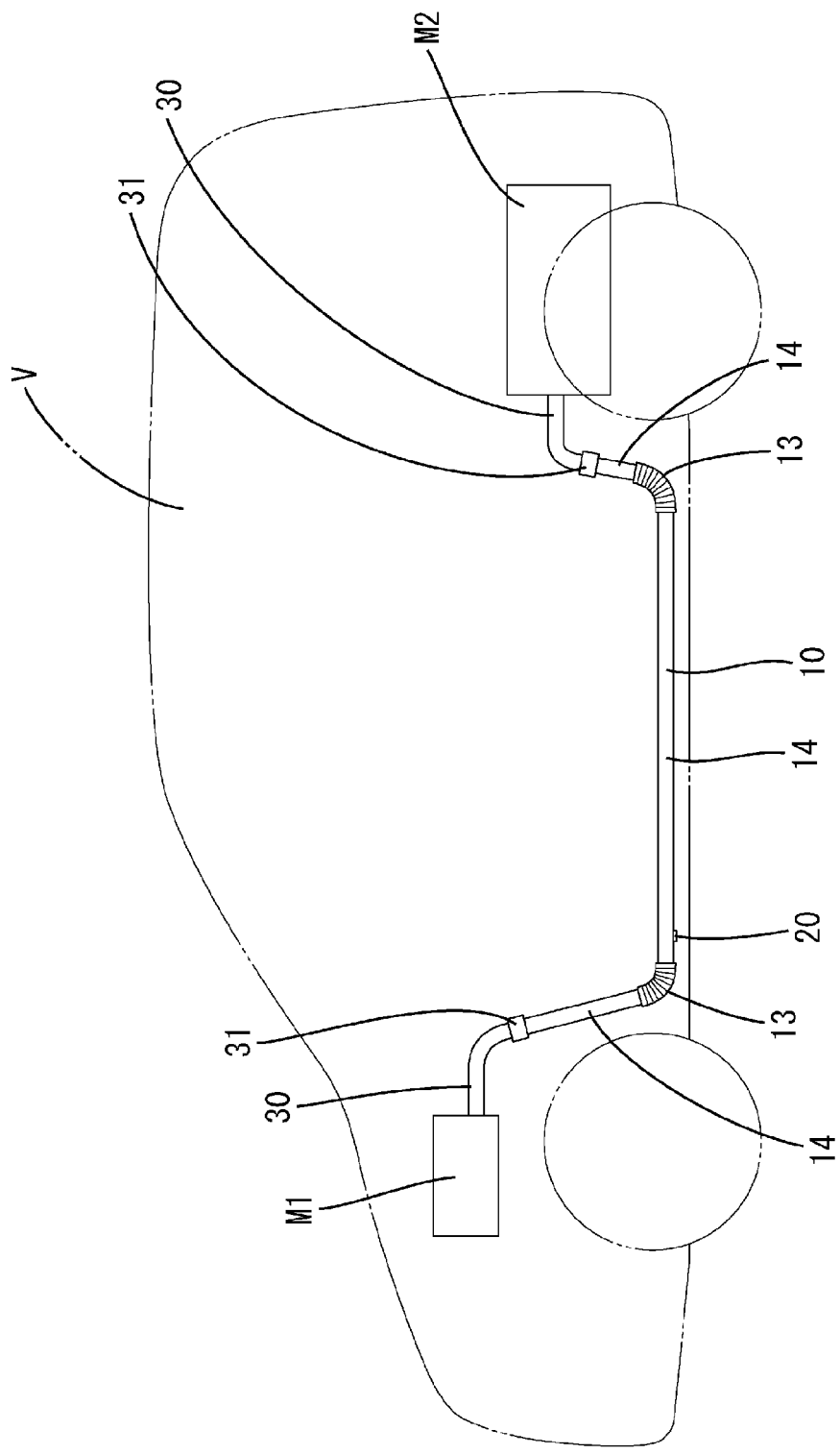
FIG. 1 is a schematic diagram showing an electric wire protecting pipe in the present embodiment in a state in which the electric wire protecting pipe is attached to a vehicle.
Figure 2:
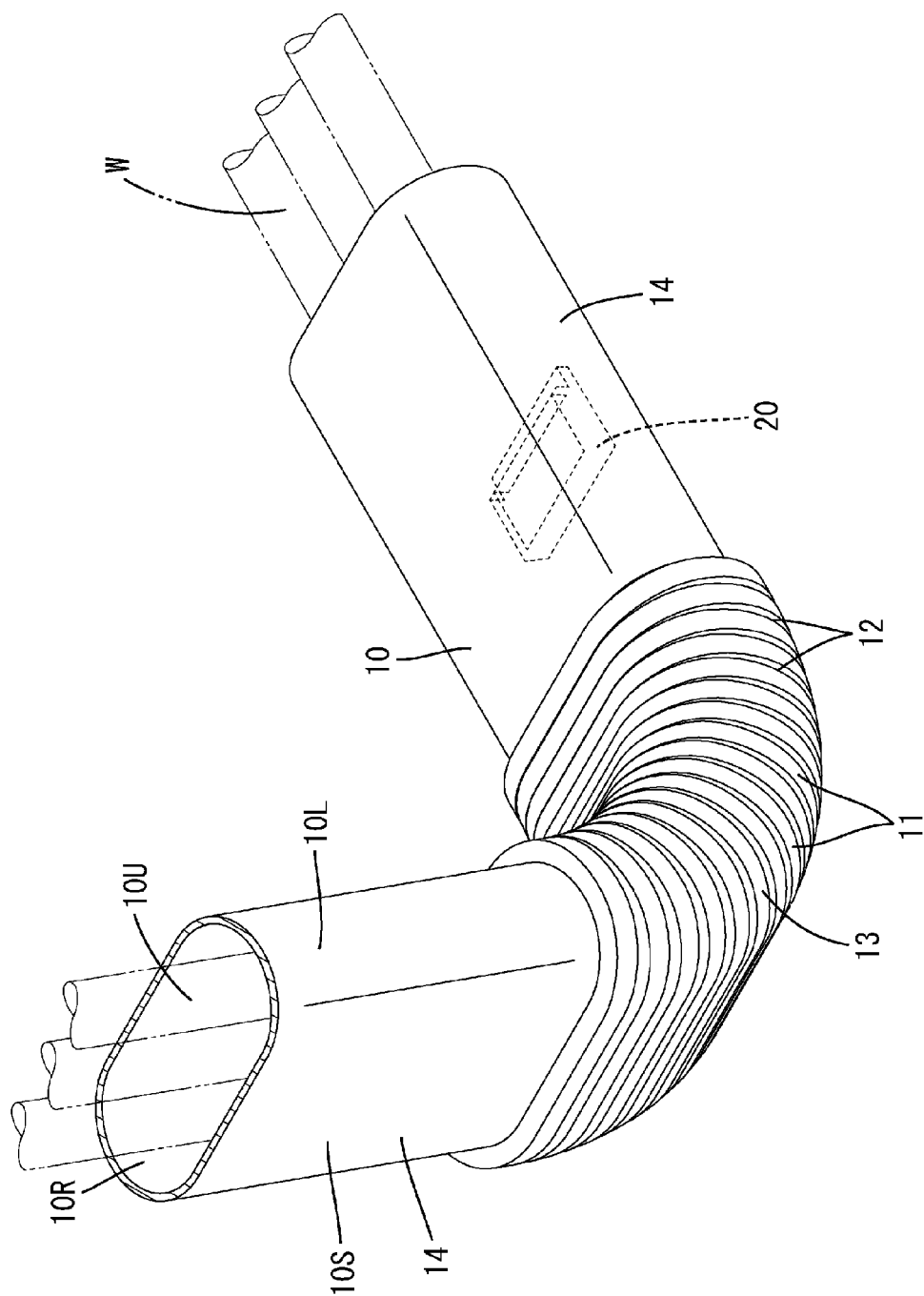
FIG. 2 is a partially enlarged perspective view showing the vicinity of a drain portion in a state in which the electric wire protecting pipe is attached to the vehicle.

As shown in FIG. 1, an electric wire protecting pipe 10 in the present embodiment is attached to a vehicle V, and a plurality of electric wires W that are part of a wire harness for connecting a device M1 arranged inside an engine room located in a front portion of the vehicle V and a device M2 arranged in a room located in a rear portion of the vehicle V are inserted into the electric wire protecting pipe 10. The wire harness is routed from the front inside the vehicle V to the rear inside the vehicle V underneath a floor of a vehicle body that serves as the outer side of a frame of the vehicle body.

Portions of the electric wires W that are drawn to the outside from two end portions of the electric wire protecting pipe 10 are protected by exterior components 30 such as a corrugate tube. The end portions of the exterior components 30 cover the end portions of the electric wire protecting pipe 10, and tape rolls 31 are wound around joints between the exterior components 30 and the electric wire protecting pipe 10.

In the following description, it is assumed that, in each constituent member, when the electric wire protecting pipe 10 is attached to the vehicle V, "front" refers to the side facing the front in a traveling direction (left side in FIG. 1), "rear" refers to the side facing the rear (right side in FIG. 1), "top" refers to the upper side, and "bottom" refers to the lower side in FIG. 1.

The electric wire protecting pipe 10 is made of a synthetic resin, and includes a bending pipe portion 13 that is easily bent and is provided with protruding portions 11 and recessed portions 12 that are alternately continuous with each other in the axial direction, and a straight pipe portion 14 that is flat and is not easily bent in the axial direction.

As shown in FIG. 1, the bending pipe portion 13 has an accordion shape, and is provided at regions at which the electric wires W are bent. In the present embodiment, the bending pipe portions 13 are provided at a position near a front end of the electric wire protecting pipe 10 and a position near a rear end thereof. After the electric wires W are inserted into the electric wire protecting pipe 10, the electric wire protecting pipe 10 is bent three-dimensionally along a path for routing the electric wires W, and is attached to the vehicle V.

The straight pipe portion 14 does not have an accordion shape, and is not bent. The straight pipe portion 14 is formed linearly, and is provided between front and rear end portions of the electric wire protecting pipe 10 and the front and rear bending pipe portions 13. Portions provided between the bending pipe portions 13 are arranged approximately horizontally underneath the floor of the vehicle V.

The electric wire protecting pipe 10 is provided with a drain portion 20 for releasing inner water to the outside. As shown in FIG. 1, the drain portion 20 is provided in the vicinity of the bending pipe portion 13 disposed at the lowest position when the electric wire protecting pipe 10 is attached to the vehicle V (the end portion of the straight pipe portion 14 on the rear side of the bending pipe portion 13 disposed on the front side of the vehicle V). Accordingly, water entering the electric wire protecting pipe 10 from joints between the exterior components 30 and the electric wire protecting pipe 10 goes downward along an inner surface of the electric wire protecting pipe 10, reaches the drain portion 20, and is released to the outside.

Figure 5:
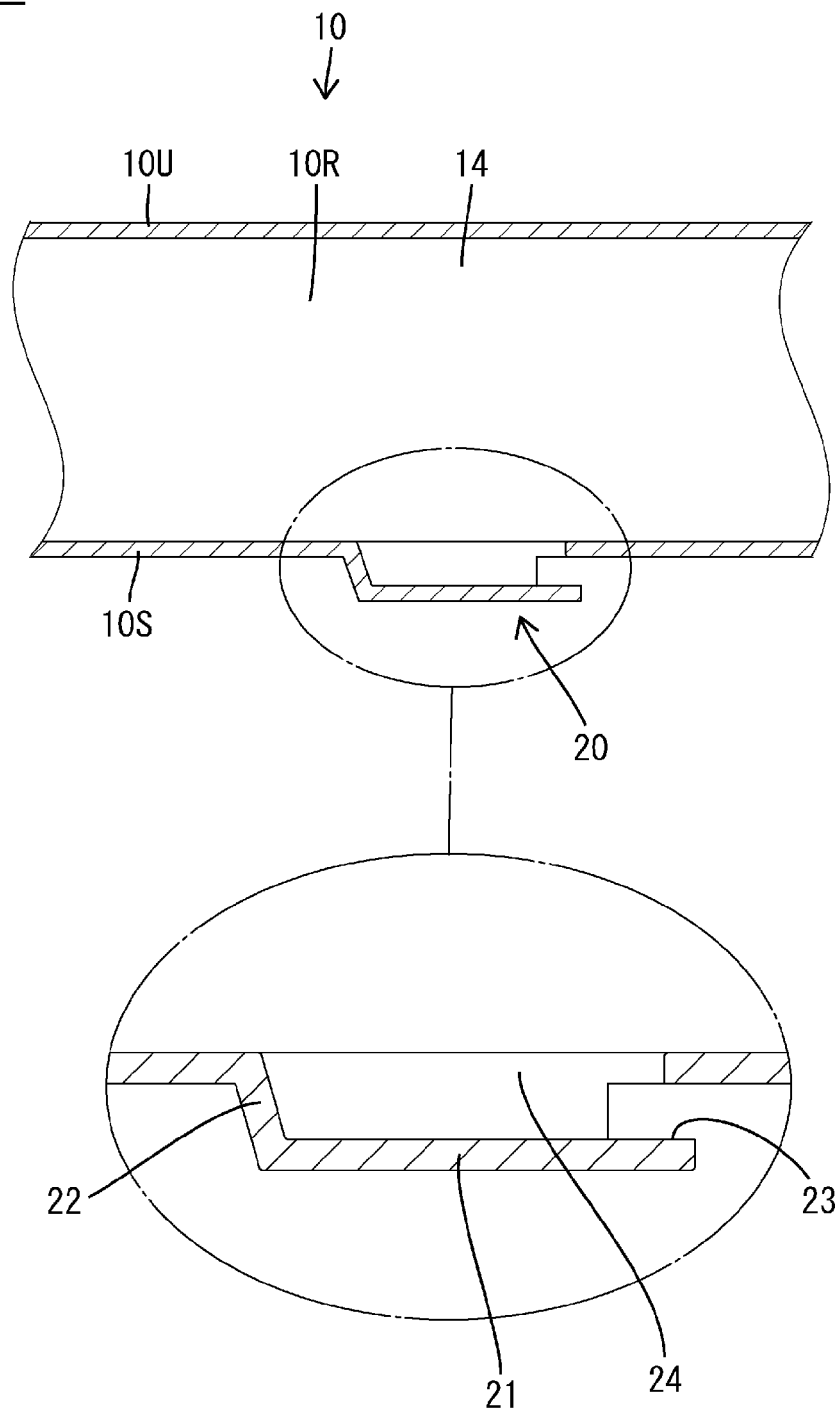
FIG. 5 is a cross-sectional view showing the drain portion, corresponding to a cross section at a position B-B in FIG. 3.
Figure 6:
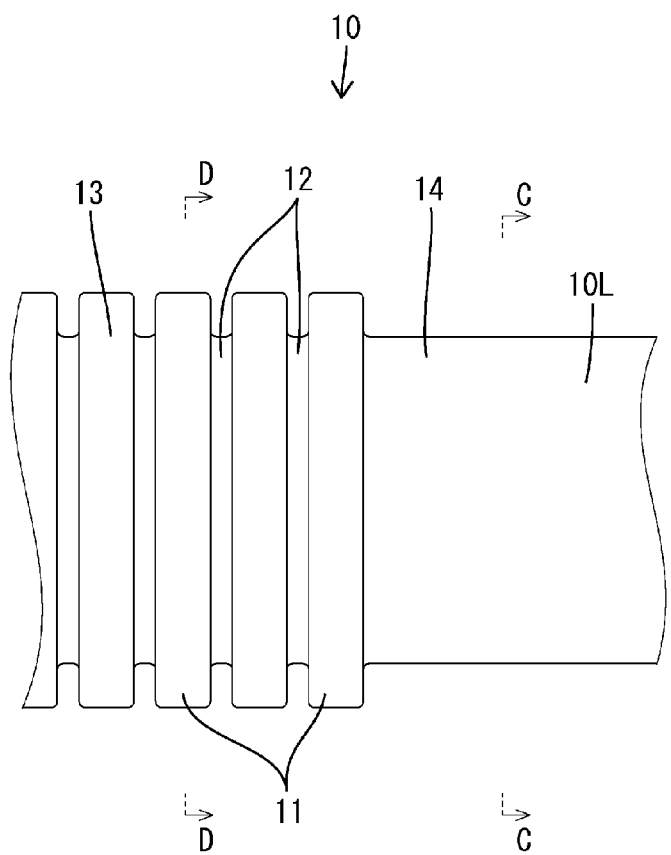
FIG. 6 is a partially enlarged side view of the electric wire protecting pipe, showing a bending pipe portion and a straight pipe portion.

As shown in FIG. 5, the drain portion 20 has a projection portion 21 that projects outward from a lower wall portion 10S that is disposed on the lower side when the electric wire protecting pipe 10 is attached to the vehicle V, and its circumferential wall portion 22 has a drain hole 23. That is, the drain portion 20 has a form in which the inside of the projection portion 21 is provided with an opening 24 that enables communication between the inside and the outside of the electric wire protecting pipe 10.

Figure 3:
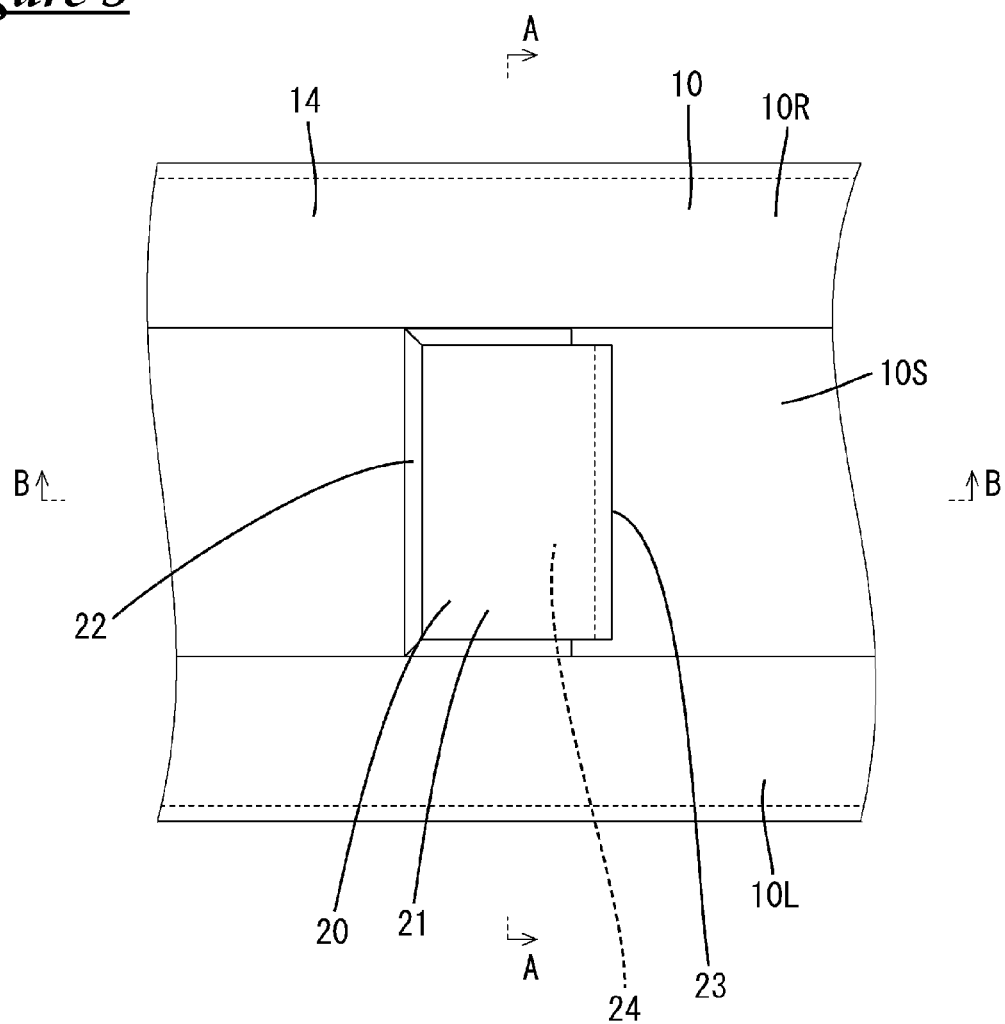
FIG. 3 is a partially enlarged bottom view of the electric wire protecting pipe showing the drain portion.
Figure 4:
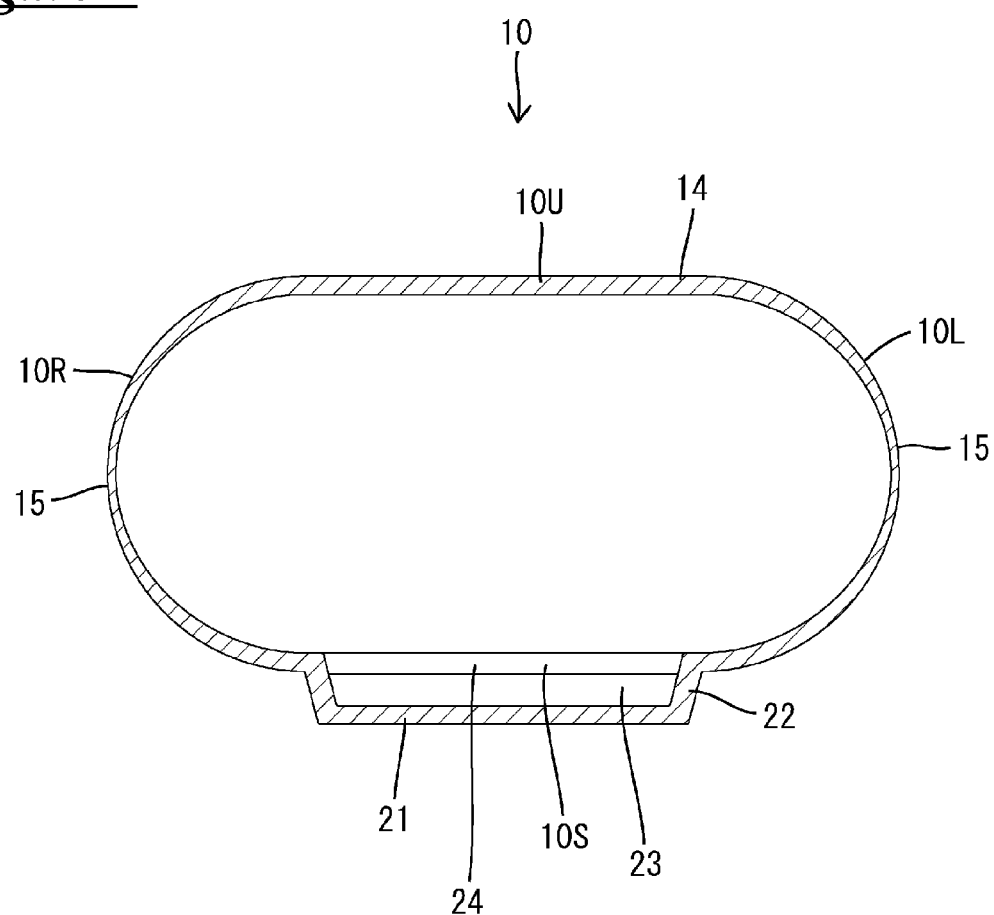
FIG. 4 is a cross-sectional view showing the drain portion, corresponding to a cross section at a position A-A in FIG. 3.

As shown in FIG. 3, when viewed from below, the projection portion 21 has a rectangular shape that is longer in the horizontal direction, and has a width (length in the horizontal direction) extending over approximately the entire width of the lower wall portion 10S. The entire opening 24 is covered by this projecting wall 21, and when viewed from below, the inside of the electric wire protecting pipe 10 is not visible.

As shown in FIG. 5, the drain hole 23 is formed in a part of the circumferential wall portion 22 of the projection portion 21, the part being disposed on the rear side when the electric wire protecting pipe 10 is attached to the vehicle V, and approximately the entire rear surface of the projection portion 21 is open rearward.

After the entire electric wire protecting pipe 10 including the projection portion 21 is integrally molded by blow molding or vacuum molding, and then the drain hole 23 is formed, thus manufacturing the electric wire protecting pipe 10. The drain hole 23 is formed by cutting a portion (a portion on the rear side) of the circumferential wall portion 22 of the projection portion 21 in the horizontal direction.

Figure 7:
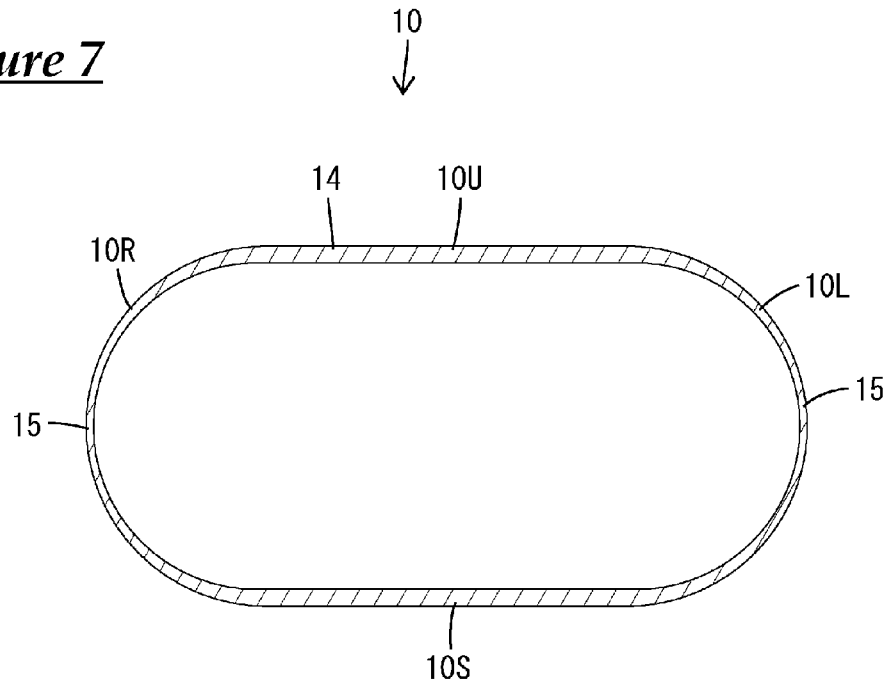
FIG. 7 is a cross-sectional view of the electric wire protecting pipe, corresponding to a cross section at a position C-C in FIG. 6.
Figure 8:
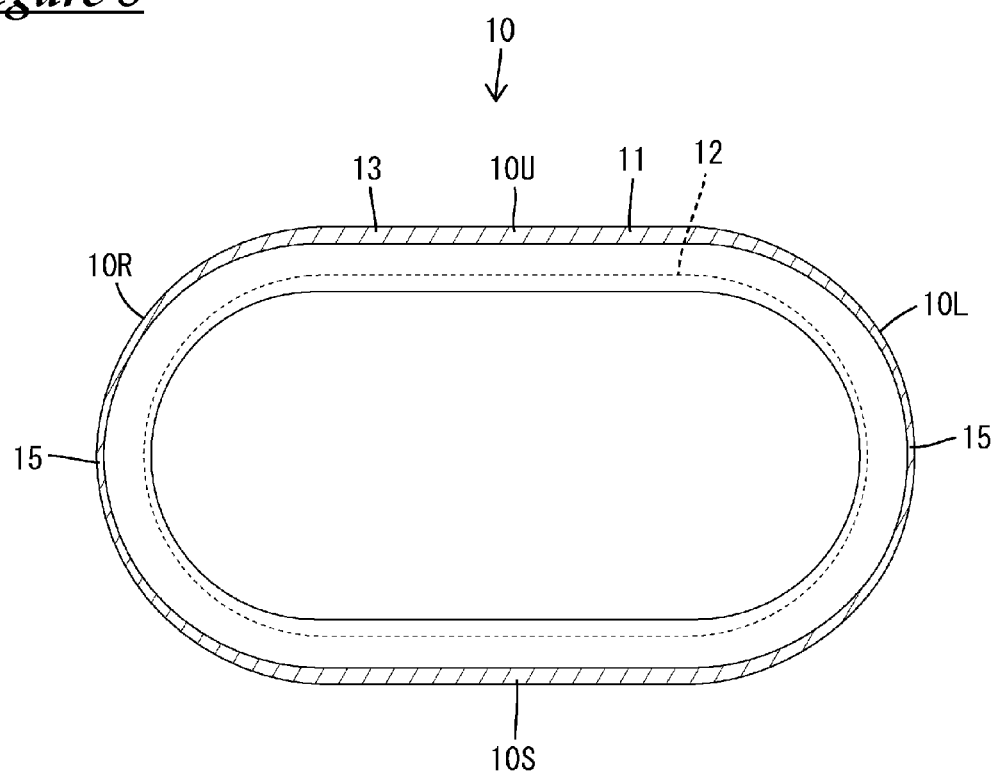
FIG. 8 is a cross-sectional view of the electric wire protecting pipe, corresponding to a cross section at a position D-D in FIG. 6.

As shown in FIGS. 7 and 8, in the electric wire protecting pipe 10, the cross section that is approximately orthogonal to the axial direction has an obround shape in which the length in the horizontal direction (the length in the direction in which a left wall portion 10L and a right wall portion 10R face each other) is longer than the length in the vertical direction (the length in the direction in which an upper wall portion 10U disposed on the upper side when the electric wire protecting pipe is attached to the vehicle and the lower wall portion 10S face each other). The upper wall portion 10U and the lower wall portion 10S are flat walls that are approximately parallel to each other, and the left wall portion 10L and the right wall portion 10R are curved walls having an arc shape.

Moreover, as shown in FIGS. 7 and 8, in the electric wire protecting pipe 10, the thickness (thickness in the direction from the inside to the outside) of the upper wall portion 10U and the lower wall portion 10S is greater than the thickness of the left wall portion 10L and the right wall portion 10R. That is, the upper wall portion 10U and the lower wall portion 10S of the electric wire protecting pipe 10 are thick-walled portions, whereas the left wall portion 10L and the right wall portion 10R are thin-walled portions.

The upper wall portion 10U and the lower wall portion 10S of the electric wire protecting pipe 10 have a constant thickness across the entire width, and the upper wall portion 10U and the lower wall portion 10S have the same thickness.

This makes it possible to protect the electric wires W from flying gravel or the like even if the electric wire protecting pipe 10 is attached to the vehicle V with the upper wall portion 10U disposed on the lower side. The thickness of the upper wall portion 10U and the lower wall portion 10S is set such that a sufficient strength for protection against flying gravel or the like while the vehicle is moving can be ensured, and in order to keep its height low, the thickness is reduced as much as possible.

The left wall portion 10L and the right wall portion 10R each have a configuration in which its thickness gradually decreases from the two end portions in the vertical direction (boundary portions to the upper wall portion 10U and the lower wall portion 10S) toward approximately a central portion in the vertical direction. Moreover, the approximately central portions in the vertical direction of the left wall portion 10L and the right wall portion 10R are thinnest portions 15 each having the smallest thickness in the electric wire protecting pipe 10. Note that the thickness of the left wall portion 10L is the same as the thickness of the right wall portion 10R.

The electric wire protecting pipe 10 have the same thickness in both the bending pipe portion 13 and the straight pipe portion 14. That is, in the electric wire protecting pipe 10, the thickness in the axial direction does not change and is constant, and the thickness of the portions that are part of the protruding portions 11 in the bending pipe portion 13 as well as the thickness of the portions that are part of the recessed portions 12 are equal to the thickness of the straight pipe portion 14.

Figure 9:
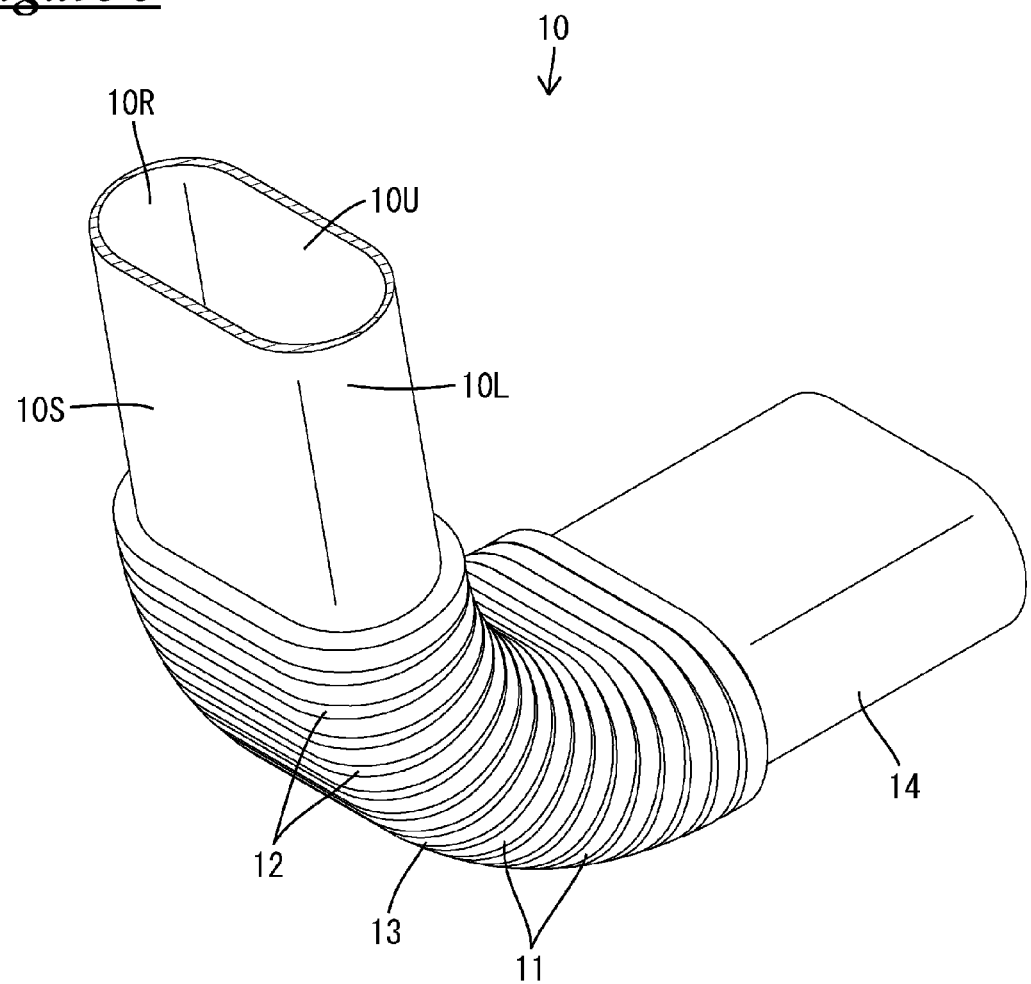
FIG. 9 is a partially enlarged perspective view of the electric wire protecting pipe showing a state in which the bending pipe portion is bent in a vertical direction.
Figure 10:
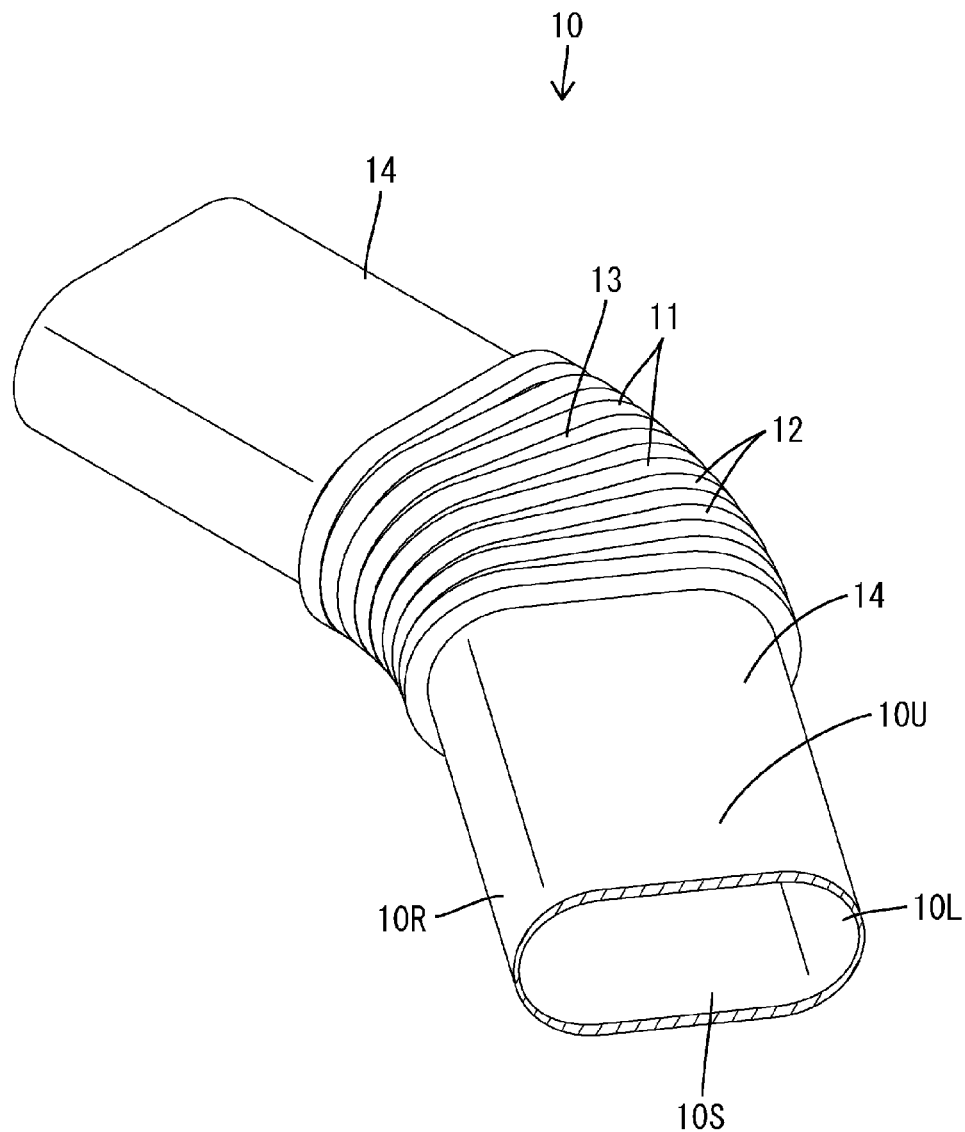
FIG. 10 is a partially enlarged perspective view of the electric wire protecting pipe showing a state in which the bending pipe portion is bent in a horizontal direction.

As shown in FIG. 9, if the bending pipe portion 13 is bent in the vertical direction, whichever wall portion of the lower wall portion 10S and the upper wall portion 10U is disposed on the outer bending side (in FIG. 9 this is the lower wall portion 10S) will expand, and whichever wall portion is disposed on the inner bending side (in FIG. 9 this is the upper wall portion 10U) will contract. Also, as shown in FIG. 10, if the bending pipe portion 13 is bent in the horizontal direction, whichever wall portion of the left wall portion 10L and the right wall portion 10R is disposed on the outer bending side (in FIG. 10 this is the left wall portion 10L) will expand, and whichever wall portion is disposed on the inner bending side (in FIG. 10 this is the right wall portion 10R) will contract. At this time, the protruding portions 11 and the recessed portions 12 that are disposed on the outer bending side deform and expand along the bending direction, and intervals between the protruding portions 11 greatly increase compared to a state in which the bending pipe portion 13 is not bent. Also, the protruding portions 11 and the recessed portions 12 that are disposed on inner bending side deform such that intervals between the protruding portions 11 decrease, and protruding ends of the protruding portions 11 come into contact with each other.

Next, the functional effects and the effects of the embodiment having the above-described configuration will be described.

The electric wire protecting pipe 10 of the present embodiment is a resin pipe into which the electric wires W are insertable, and includes the bending pipe portion 13 that is easily bent and is provided with the protruding portions 11 and the recessed portions 12 that are alternately continuous with each other in the axial direction, and the straight pipe portion 14 that is flat and is not easily bent in the axial direction. The thickness of the lower wall portion 10S disposed on the lower side when the electric wire protecting pipe 10 is attached to the vehicle V is greater than the thickness of the left wall portion 10L and the right wall portion 10R that are disposed on the left and right sides. According to this configuration, the strength of the lower wall portion 10S that flying gravel or the like tends to hit while the vehicle is moving is high, and the left wall portion 10L and the right wall portion 10R that are disposed on the left and right sides easily deform, and thus it is possible to prevent holes from being formed in the electric wire protecting pipe 10 by flying gravel or the like while the vehicle is moving, and to easily bend the bending pipe portion 13 in the horizontal direction.

Also, in the electric wire protecting pipe 10, the cross section that is approximately orthogonal to the axial direction has a flat shape in which the length in the vertical direction is longer than the length in the horizontal direction. Such a configuration makes it possible to reduce its height, compared to cases where the cross section has a circular shape, for example, and thereby is advantageous in cases where there is a limitation on the height of an arrangement space.

Furthermore, compared to a cross-sectionally circular bending pipe portion 13 having an equal volume, such a flat bending pipe portion 13 has a smaller height in the vertical direction, and thus is easily bent in the vertical direction. Thus, even if the upper wall portion 10U and the lower wall portion 10S are thick, the bending pipe portion 13 can be easily bent in the vertical direction.

In addition, compared to the cross-sectionally circular bending pipe portion 13 having an equal volume, for example, such a flat bending pipe portion 13 has a wider width in the horizontal direction, and thus is not easily bent in the horizontal direction. However, since the left wall portion 10L and the right wall portion 10R are thin, the bending pipe portion 13 can be easily bent in the horizontal direction.

That is, according to the electric wire protecting pipe 10 of the present embodiment, the bending pipe portion 13 can be easily bent in either the vertical direction or the horizontal direction.

Other Embodiments

The present invention is not limited to the embodiment described above using the foregoing description and drawings, and embodiments such as the following are also encompassed in the technical scope of the present invention.

Although in the above-described embodiment, a pair of bending pipe portions 13 are provided on the front and rear sides, the configuration is not limited to this, and positions of the bending pipe portions and the straight pipe portion, their lengths, and the like can be changed as appropriate in accordance with a path for routing electric wires.

Although in the above-described embodiment, the upper wall portion 10U and the lower wall portion 10S of the electric wire protecting pipe 10 have an equal thickness, the configuration is not limited to this, and the thickness of the upper wall portion may be smaller than the thickness of the lower wall portion.

Although in the above-described embodiment, the cross-sectional shape of the electric wire protecting pipe 10 is obround, it is not limited to this, and the cross-sectional shape of an electric wire protecting pipe 10 may be any shape such as a circular shape, a square shape, a flat rectangular shape, or an elliptic shape, for example.

Although in the above-described embodiment, the thickness of the lower wall portion 10S is constant across the entire width and the thickness of the left wall portion 10L and the right wall portion 10R gradually decreases toward their centers in the vertical direction, the configuration is not limited to this, and if the electric wire protecting pipe has an approximately circular cross section, a configuration is possible in which a portion located at a lower end is thickest, portions located at left and right ends are thinnest, the thickness from the lower end to the left and right ends gradually change, or if the electric wire protecting pipe has an approximately rectangular cross section, for example, the thickness of the left wall portion and the right wall portion may be constant.

Although in the above-described embodiment, the lower wall portion 10S of the electric wire protecting pipe 10 is provided with the drain portion 20, the drain portion needs not to be provided.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

REFERENCE SIGNS LIST

V Vehicle
W Electric wire
10 Electric wire protecting pipe
10L Left wall portion
10R Right wall portion
10S Lower wall portion
10U Upper wall portion
11 Protruding portion
12 Recessed portion
13 Bending pipe portion
14 Straight pipe portion

The invention claimed is:

1. An electric wire protecting pipe that is a resin pipe into which electric wires are insertable, the electric wire protecting pipe comprising:
   a bending pipe portion that is easily bent and is provided with protruding portions and recessed portions that are alternately continuous with each other in an axial direction; and
   a straight pipe portion that is flat and is not easily bent in the axial direction,
   wherein in either the bending pipe portion or the straight pipe portion, a thickness of a lower wall portion that is disposed on a lower side when the electric wire protecting pipe is attached to a vehicle is greater than a thickness of a left wall portion and a right wall portion that are disposed on left and right sides, and the lower wall portion is a relatively thick-walled portion, whereas the left wall portion and the right wall portion are relatively thin-walled portions.

2. The electric wire protecting pipe according to claim 1, wherein
   a cross section that is approximately orthogonal to the axial direction has a flat shape in which a length in a direction in which the left wall portion and the right wall portion face each other is longer than a length in a direction in which an upper wall portion that is disposed on an upper side when the electric wire protection pipe is attached to the vehicle and the lower wall portion face each other.

3. A wire harness in which a plurality of electric wires are inserted into the electric wire protecting pipe according to claim 1.

* * * * *